(12) United States Patent
Åkerlind

(10) Patent No.: US 7,432,472 B2
(45) Date of Patent: Oct. 7, 2008

(54) FLOORING BOARD WITH AN EMBEDDED ELECTRICALLY INFLUENCED SHEET

(75) Inventor: Jan Åkerlind, Stockholm (SE)

(73) Assignee: Pilgrimsfalken AB, Stockholm (SE)

( * ) Notice: Subject to any disclaimer, the term of this patent is extended or adjusted under 35 U.S.C. 154(b) by 122 days.

(21) Appl. No.: 10/555,162

(22) PCT Filed: May 3, 2004

(86) PCT No.: PCT/SE2004/000672

§ 371 (c)(1),
(2), (4) Date: Nov. 2, 2005

(87) PCT Pub. No.: WO2004/099530

PCT Pub. Date: Nov. 18, 2004

(65) Prior Publication Data

US 2006/0289144 A1    Dec. 28, 2006

(30) Foreign Application Priority Data

May 5, 2003    (SE) .................................... 0301291

(51) Int. Cl.
 *H05B 1/00*    (2006.01)
 *H05B 3/08*    (2006.01)
 *E04C 2/52*    (2006.01)

(52) U.S. Cl. ....................... 219/213; 219/541; 52/220.2

(58) Field of Classification Search ................. 219/213, 219/538, 541, 544, 548, 552; 165/56, 171, 165/183; 359/273, 265; 52/173.3, 220.2; 428/209

See application file for complete search history.

(56) References Cited

U.S. PATENT DOCUMENTS

| 6,092,587 | A | 7/2000 | Ingram |
| 6,456,418 | B1 * | 9/2002 | Martin et al. ............... 359/273 |
| 6,928,775 | B2 * | 8/2005 | Banister .................... 52/173.3 |
| 2004/0031219 | A1 * | 2/2004 | Banister .................... 52/220.2 |
| 2005/0221066 | A1 * | 10/2005 | Brist et al. ................. 428/209 |

FOREIGN PATENT DOCUMENTS

| EP | 0592159 A1 | 4/1994 |
| GB | 888842 A | 2/1962 |

* cited by examiner

*Primary Examiner*—Sang Y Paik
(74) *Attorney, Agent, or Firm*—Frishauf, Holtz, Goodman & Chick, P.C.

(57) ABSTRACT

A flooring board with a tongue and a groove, including a covering layer, a base plate, and an embedded foil between the covering layer and the base plate. The embedded foil is provided with electrical connecting means for obtaining an effect upon the foil via a connected electric voltage. The electrical connecting means includes a first common connecting means having a first portion positioned on an under side of the groove and a second portion positioned on an upper side of the tongue which are connected by at least one line. The electrical connecting means also includes a second common connecting means having a first portion positioned on an under side of the tongue and a second portion positioned on an upper side of the groove which are connected by at least one line.

21 Claims, 1 Drawing Sheet

FLOORING BOARD WITH AN EMBEDDED ELECTRICALLY INFLUENCED SHEET

Figure 1:
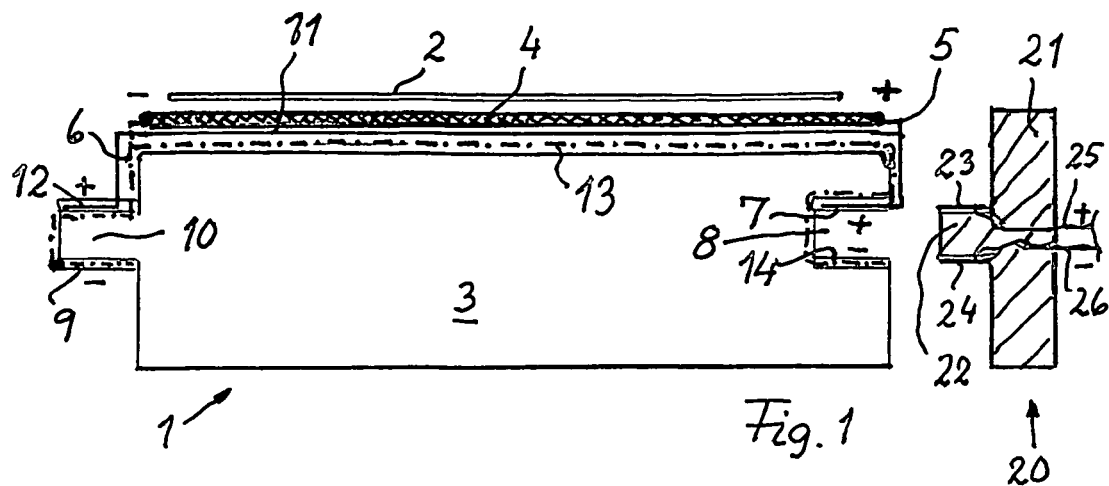

This application is a U.S. National Phase Application under 35 USC 371 of International Application PCT/SE2004/000672 filed May 3, 2004.

The invention relates to a flooring board with groove and tongue joints or similar joints to adjacent, identical flooring boards and composed of at least one covering layer, a base plate supporting the covering layer, and between them an embedded sheet provided with electric connecting means attached to the grooves and tongues for obtaining an effect upon the sheet conditioned by a connected electric voltage.

A flooring board of this type is previously suggested in the SE 0203343-9, which relates to a flooring heated by an embedded heating foil. Connecting means to the heating foil are extended by pairs on each side of the flooring board at several places along the length of the flooring board. In this way it is possible to supply an electric current from flooring board to flooring board such, that all the floor becomes uniformly heated. It is a condition, however, that the flooring boards become mounted mutually in exactly correct position lengthwise, such that the connecting means at grooves and tongues become positioned in line. This is no problem when the flooring boards have standard lengths, but as soon as cutting-off of the standard lengths takes place, displacements will easily occur such that electrical interruptions are a fact all over the floor. This is usually not observed until all the floor is finished, in which case the interruption is difficult to locate and repair.

The object of the invention is to achieve an improved electric connection between flooring boards for heating the floor as well as for other purposes, to electrically influence the embedded sheet or a corresponding foil, for example by using electro-chromatic or thermo-chromatic material in the sheet or foil to achieve lighting effects or colour changes in the sheet or foil influenced by the electricity or by heat generated by the electricity.

This has, according to the invention, been achieved by the fact, that in the above mentioned flooring board the one type of connecting means of the sheet is located on the under side of the groove and via a line also on the upper side of the tongue, and the other type of connecting means is located on the under side of the tongue and via a line also on the upper side of the groove. In this way both sides of the grooves and tongues are utilized in a way, that permits mutually connected flooring boards to be displaced lengthwise without a negative influence on the electric contact between the flooring boards. The connecting means of the foil can in fact without interruptions extend along all the length of the respective groove and tongue. Moreover, a connection in parallel is achieved by the electric connections of the different flooring boards.

The floor-laying may preferably be completed by using a connection member connected to a voltage source, which connection member has the shape of lath with a suitable width and a height equal to the thickness of the flooring board, and a tongue protruding into a groove of the flooring board, or a groove into which o tongue of the flooring board protrudes.

Figure 2:
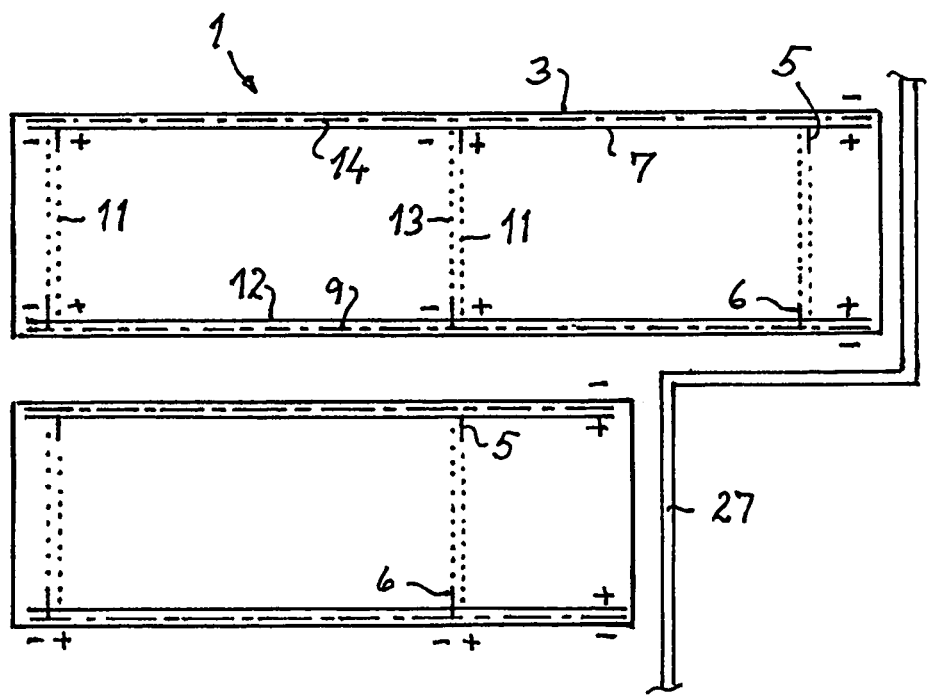
Figure 3:
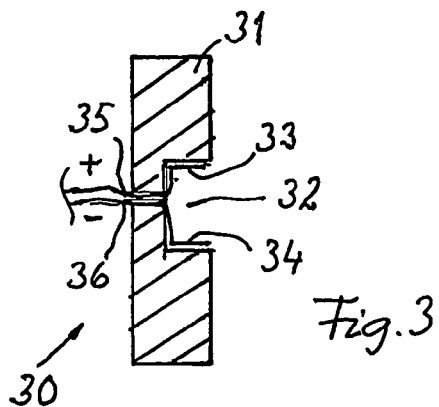

The invention is disclosed more in detail in the following with reference to the attached drawing schematically showing an embodiment of a flooring board according to the invention, and on which FIG. 1 is an end view of the flooring board and a cross section of an electric connection member, FIG. 2 a plan view of two flooring boards prior to their sliding together, and FIG. 3 is a cross section of an alternative connection member.

FIG. 1 discloses the flooring board 1, which is composed of a covering layer 2 in the shape of a laminated plastic, and a base plate 3 made of wood supporting the covering layer. A heating foil 4 is embedded between the covering layer 2 and the base plate 3, for the sake of clarity shown on the drawing with an interspace between the different objects. The longitudinal edge parts of the heating foil are designed such, that electric connecting lines 5 may be attached at fixed intervals in contact with the active parts of the heating foil, and in the same manner connecting lines 6 can be attached at fixed intervals on the opposite side of the heating foil. The connecting lines 5 are connected to a common connecting means 7, which extends along the under side of a groove 8 of the flooring board, and the connecting lines 6 are connected to a common connecting means 9, indicated by a dot-dash line, which extends along the under side of a tongue 10. Further, lines 11, indicated by dotted lines in FIG. 2, extend from the common connecting means 7 to a common connecting means 12, which extends along the upper side of the tongue 10 of the flooring board. Moreover, lines 13, indicated by dotted lines in FIG. 2, extend from the common connecting means 9 to a common connecting means 14, indicated by a dot-dash line, which extends along the upper side of the groove 8.

A voltage can be supplied to the common connecting means 7 and 14 or 9 and 12, for instance by a connection member 20, to the right in FIG. 1, in the shape of a lath 21 provided with a tongue 22 on which two terminal contacts 23,24 are attached connected to a voltage source by two connection wires 25,26. This connection member is intended to be secured to the flooring board 1 by pressing the tongue 22 into the groove 8. The heating foil 4 then is supplied with a voltage, and if additional flooring boards 1 are connected, which is suggested in FIG. 2 with an additional flooring board, the heating foils of these flooring boards will be supplied with the same voltage due to the contact between the common connecting means 9 and 12 on the tongue of the flooring board 1 and corresponding common connecting means of the groove of adjacent flooring board, and so on.

As an alternative, the voltage may be supplied by a connection member 30 shown in FIG. 3 consisting of a lath 31 with the same height as the thickness of the flooring board 1 and provided with a groove 32 in which two terminal contacts 33,34 are attached connected to a voltage source, not shown, by two connection wires 35,36. The connection member is designed to be connected to the flooring board by pressing the tongue 10 into the groove 32.

In the example shown a DC-voltage is utilized and the different lines are indicated by plus and minus signs to make it easier to understand the electric wiring, but it goes without saying that it is possible as an alternative to use an AC-voltage. It is obvious, that the flooring boards may be laterally displaced without interruptions of the voltage supply. A flooring board may also be cut off to fit the position of a wall 27, as shown in FIG. 2, as long as a part of the flooring board remains with a pair of lines 11,13.

The above description concerning heating foils is valid also with respect to embedded material layers with corresponding properties and also when using a material layer or a foil containing electro-chromatic material, i.e. a layer or foil which is treated to change character, mainly colour but also transparency or similar properties, in dependence on the magnitude of a connected voltage. This is also valid with respect to a layer or foil containing thermo-chromatic material, i.e. a layer or foil which is treated to change character as described above in dependence on the temperature of the layer or foil, which temperature is regulated by a suitable combination with an electrically regulated heating foil. A floor may of course be provided completely or partly with flooring boards with layers or foils of one of the two kinds or both kinds, in which case the common connecting means in advance are provided with interruptions, which result in the intended voltage supply of only the intended, different parts of the floor.

The invention claimed is:

1. An elongated flooring board comprising:
   a tongue and a groove extending along the elongated flooring board, for joining the flooring board to at least one adjacent, identical flooring board;
   at least one covering layer;
   a base plate supporting the at least one covering layer; and
   an embedded sheet which is provided between the base plate and the at least one covering layer and which includes electrical connecting means attached to the tongue and the groove for obtaining an effect upon the sheet via a connected electric voltage,
   wherein the electrical connecting means comprises: (i) a first type of connecting means including a first portion located along an under side of the groove and a second portion located along an upper side of the tongue, the first and second portions of the first type of connecting means being connected via at least one line, and (ii) a second type of connecting means including a first portion located along an under side of the tongue and a second portion located along an upper side of the groove, the first and second portions of the second type of connecting means being connected via at least one line.

2. The flooring board according to claim 1, wherein the first portion of the first type of connecting means and the second portion of the second type of connecting means extend along an entire length of the groove, and the second portion of the first type of connecting means and the first portion of the second type of connecting means extend along an entire length of the tongue.

3. The flooring board according to claim 1, wherein a connection member connected to a voltage source is shaped as a lath with a same height as a thickness of the flooring board and comprises a tongue protruding into the groove of the flooring board.

4. The flooring board according to claim 1, wherein a connection member connected to a voltage source is shaped as a lath with a same height as a thickness of the flooring board and comprises a groove into which the tongue of the flooring board protrudes.

5. The flooring board according to claim 1, wherein at least a part of the sheet comprises a heating sheet for heating a floor.

6. The flooring board according to claim 1, wherein at least a part of the sheet comprises an electro-chromatic material having a characteristic feature which changes when influenced by the connected voltage.

7. The flooring board according to claim 1, wherein at least a part of the sheet comprises a heating sheet and at least a part of the sheet comprises a thermo-chromatic material which is influenced by the heating sheet, and which has a characteristic feature which changes when influenced by a temperature change caused by the connected voltage.

8. The flooring board according to claim 2, wherein a connection member connected to a voltage source is shaped as a lath with a same height as a thickness of the flooring board and comprises a tongue protruding into the groove of the flooring board.

9. The flooring board according to claim 2, wherein a connection member connected to a voltage source is shaped as a lath with a same height as a thickness of the flooring board and comprises a groove into which the tongue of the flooring board protrudes.

10. The flooring board according to claim 2, wherein at least a part of the sheet comprises a heating sheet for heating a floor.

11. The flooring board according to claim 3, wherein at least a part of the sheet comprises a heating sheet for heating a floor.

12. The flooring board according to claim 4, wherein at least a part of the sheet comprises a heating sheet for heating a floor.

13. The flooring board according to claim 2, wherein at least a part of the sheet comprises an electro-chromatic material having a characteristic feature which changes when influenced by the connected voltage.

14. The flooring board according to claim 3, wherein at least a part of the sheet comprises an electro-chromatic material having a characteristic feature which changes when influenced by the connected voltage.

15. The flooring board according to claim 4, wherein at least a part of the sheet comprises an electro-chromatic material having a characteristic feature which changes when influenced by the connected voltage.

16. The flooring board according to claim 5, wherein at least a part of the sheet comprises an electro-chromatic material having a characteristic feature which changes when influenced by the connected voltage.

17. The flooring board according to claim 2, wherein at least a part of the sheet comprises a heating sheet and at least a part of the sheet comprises a thermo-chromatic material which is influenced by the heating sheet, and which has a characteristic feature which changes when influenced by a temperature change caused by the connected voltage.

18. The flooring board according to claim 3, wherein at least a part of the sheet comprises a heating sheet and at least a part of the sheet comprises a thermo-chromatic material which is influenced by the heating sheet, and which has a characteristic feature which changes when influenced by a temperature change caused by the connected voltage.

19. The flooring board according to claim 4, wherein at least a part of the sheet comprises a heating sheet and at least a part of the sheet comprises a thermo-chromatic material which is influenced by the heating sheet, and which has a characteristic feature which changes when influenced by a temperature change caused by the connected voltage.

20. The flooring board according to claim 5, wherein at least a part of the sheet comprises a thermo-chromatic material which is influenced by the heating sheet, and which has a characteristic feature which changes when influenced by a temperature change caused by the connected voltage.

21. The flooring board according to claim 6, wherein at least a part of the sheet comprises a heating sheet and at least a part of the sheet comprises a thermo-chromatic material which is influenced by the heating sheet, and which has a characteristic feature which changes when influenced by a temperature change caused by the connected voltage.

* * * * *